(12) United States Patent
Rudi

(10) Patent No.: US 7,142,386 B1
(45) Date of Patent: Nov. 28, 2006

(54) TAPE DRIVE WITH MICROSWITCH PROTECTOR

(75) Inventor: Guttorm Rudi, Fjellhamar (NO)

(73) Assignee: Tandberg Storage ASA, Oslo (NO)

( * ) Notice: Subject to any disclaimer, the term of this patent is extended or adjusted under 35 U.S.C. 154(b) by 0 days.

(21) Appl. No.: 11/212,863

(22) Filed: Aug. 26, 2005

(51) Int. Cl.
*G11B 15/04* (2006.01)

(52) U.S. Cl. .......................................... 360/60; 360/71

(58) Field of Classification Search ...................... None
See application file for complete search history.

(56) References Cited

U.S. PATENT DOCUMENTS

| | | | |
|---|---|---|---|
| 3,826,489 A | * | 7/1974 | Watkins, Jr. ................. 360/132 |
| 3,950,786 A | * | 4/1976 | Shapley ....................... 360/132 |
| 4,158,865 A | * | 6/1979 | Sato ........................... 360/73.07 |
| 4,514,775 A | * | 4/1985 | Manning et al. ........... 360/96.6 |
| 5,184,255 A | * | 2/1993 | Lowry et al. ................. 360/60 |

* cited by examiner

*Primary Examiner*—K. Wong
(74) *Attorney, Agent, or Firm*—Schiff Hardin LLP

(57) ABSTRACT

A tape drive has a microswitch, with a microswitch plunger, that interacts with a tape cartridge having a recess therein that is selectively closed or opened by a sliding element movable back and forth in the recess, to detect whether the recess is opened or closed and thus to enable or disenable a data transfer function between the tape drive and the tape cartridge. To protect the plunger against breakage, and to allow changing the position of the sliding element without interference by the plunger, the tape drive has a plunger protector pivotably mounted in that is interposed between the sliding element and the plunger. The plunger protector smoothly transfers forces associated with the back and forth movement of the sliding element to forces in the direction of movement of the plunger.

12 Claims, 3 Drawing Sheets

TAPE DRIVE WITH MICROSWITCH PROTECTOR

BACKGROUND OF THE INVENTION

1. Field of the Invention

The present invention relates to tape drives of the type having a unit that enables or disenables a function associated with data transfer or storage with respect to a magnetic tape in a cartridge inserted in the drive, wherein a microswitch is used to detect whether a sliding element on the tape cartridge has been manually actuated to close or block a recess in the tape cartridge.

2. Description of the Prior Art

Most cassettes or cartridges in which magnetic recording tape is spooled have an element that is accessible at the exterior of the cassette or cartridge housing that allows a user to prevent erasure of information already stored on the tape, or to prevent overwriting of existing information with new information. A common example of such an actuator is the breakaway tab on music recording cassettes and VHS cassettes. When such a cassette is inserted in a playback unit, the tab comes to be located adjacent a lever or a plunger of a small switch. As long as the tab is in place, movement of the plunger or the lever is prevented. When the tab is broken away by a user, the plunger or lever is then permitted to move into the recess that was previously blocked by the tab, thereby actuating the switch and disenabling the playback unit from operating in a particular manner, such as to erase data stored on the tape or to overwrite data stored on the tape.

In the case of tape cartridges for use in high-speed back-up tape drives, the cartridge housing typically is of a more rugged construction than a conventional plastic cassette housing. Such tape cartridges, instead of a breakable tab, typically have a recess at one surface of the cartridge, such as the bottom surface, that is opened or closed by a sliding element that is disposed in an adjacent wall of the cartridge housing, such as a lateral wall. Such a conventional tape cartridge 1 is shown in FIG. 1, having a recess 2 in the bottom thereof that is opened or closed by sliding a tab 5 back and forth. When the tab 5 is manually moved to open the recess 2, this permits the plunger 3 of a microswitch connected to a read/write control 4 to enter into the recess. The plunger 3 typically is spring-biased to move in a direction indicated by the double arrow that is substantially perpendicular to the sliding direction of the tab 5. When the tab 5 is moved to a position that closes or blocks the recess 2, the plunger 3 is not able to move into the recess.

The state of the microswitch (i.e. whether the plunger 3 has moved into the recess 2, or been prevented from moving into the recess 2) is detected by the read/write control 4, which then appropriately enables or disenables certain functions of the tape drive dependent thereon.

A problem with such conventional arrangements that make use of a sliding tab 5 is that the microswitch plunger 3 is small and relatively fragile, and can easily be bent or broken if it is located in the recess 2, and an attempt is then made to slide the tab 5 to the closed position. Not only does this situation present a risk of breakage of the plunger 3, but also it precludes changing the status of the functions that have been enabled or disenabled while the tape cartridge 1 is disposed in the tape drive. Many users would like to have the capability of actuating the tab 5 from an opened position to a closed position while the tape cartridge 1 remains in the tape drive.

SUMMARY OF THE INVENTION

It is an object of the present invention to provide a tape drive for use with a tape cartridge of the type having a sliding tab wherein the microswitch plunger that interacts with the sliding tab is protected from damage.

It is a further object of the present invention to provide such a tape drive that allows the tab to be moved from an opened position to a closed position while the tape cartridge remains in the tape drive.

It is a further object of the present invention to provide a method employing a microswitch for detecting whether the sliding tab of a tape cartridge is opened or closed, that affords protection against breakage of the microswitch plunger and that allows the sliding tab to be moved from an open position to a closed position while the tape cartridge remains in place in the tape drive.

The above objects are achieved in accordance with the present invention by a tape drive that is adapted to interact with a magnetic tape cartridge having a recess that is selectively closed or opened by a sliding element that is movable back and forth in the recess, and that has a microswitch with a plunger for detecting whether the recess is open or closed, and having a plunger protector with a first end pivotably mounted in the housing of the drive, and a second end disposed between the plunger and the sliding element. The second end is adapted to smoothly engage the sliding element as it is moved back and forth in the recess, and in response to allow movement of the plunger in a direction substantially perpendicular to the sliding direction while preventing breakage of the plunger due to the movement of the sliding element. The upper surface of the second end of the plunger protector thus engages the sliding element and receives the lateral force resulting from movement of the sliding element and, due to the pivoted mounting of the first end of the plunger protector, this lateral force is transferred as a substantially perpendicularly-acting force to the microswitch plunger, which engages the bottom surface of the second end of the plunger protector.

The plunger of the microswitch itself usually will be spring-biased in the microswitch housing, so as to normally urge the plunger toward the recess. The plunger protector can be spring-biased in the tape drive housing as well, so that the second end is normally urged into the recess of the tape cartridge.

The upper surface of the second end of the plunger protector can be provided with a ramp-like projection that engages the leading side of the sliding element. The ramp element achieves a smooth transition between the lateral movement of the sliding element and the pivoting movement of the plunger protector.

The above objects also are achieved in accordance with the invention by a method for enabling or disenabling certain functions associated with a tape drive, including the steps of detecting, using a microswitch, whether a recess in a tape cartridge has been opened or closed by a sliding element, wherein the sliding direction of the sliding element is substantially perpendicular to the detection movement direction of the plunger, and interposing a pivotably mounted plunger protector between the sliding element and the plunger that, by pivoting movement, smoothly transfers the force in the direction of movement of the sliding element to a force in the detection movement direction of the plunger.

DESCRIPTION OF THE PREFERRED EMBODIMENTS

In the description below, the terms "lateral" and "vertical" will be used to describe different movement directions, however, it will be understood that these designations are arbitrary, since the tape drive and the tape cartridge therein can be arbitrarily oriented. The terms "lateral" and "vertical" therefor are used generically to describe two directions of movement that are substantially perpendicular to each other.

Figures 1, 2:
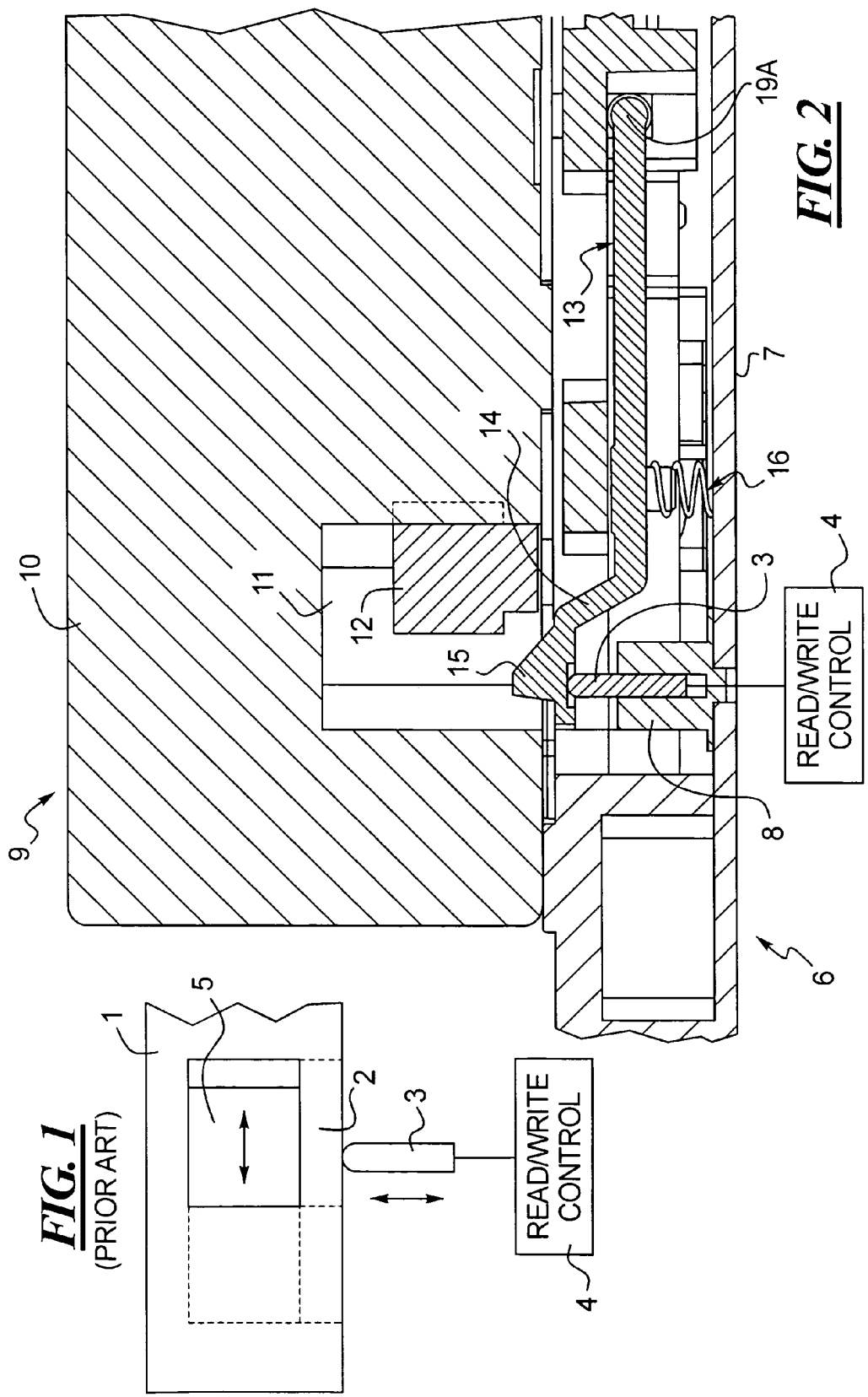
FIG. 1, as noted above, schematically illustrates a conventional tape cartridge interacting with the microswitch of a read/write control of a conventional tape drive.
FIG. 2 is a sectional view of a portion of a conventional tape cartridge, and a portion of a tape drive having a plunger protector constructed and operating in accordance with the present invention, illustrating the situation when the sliding element of the tape cartridge is in an open state.
Figure 3:
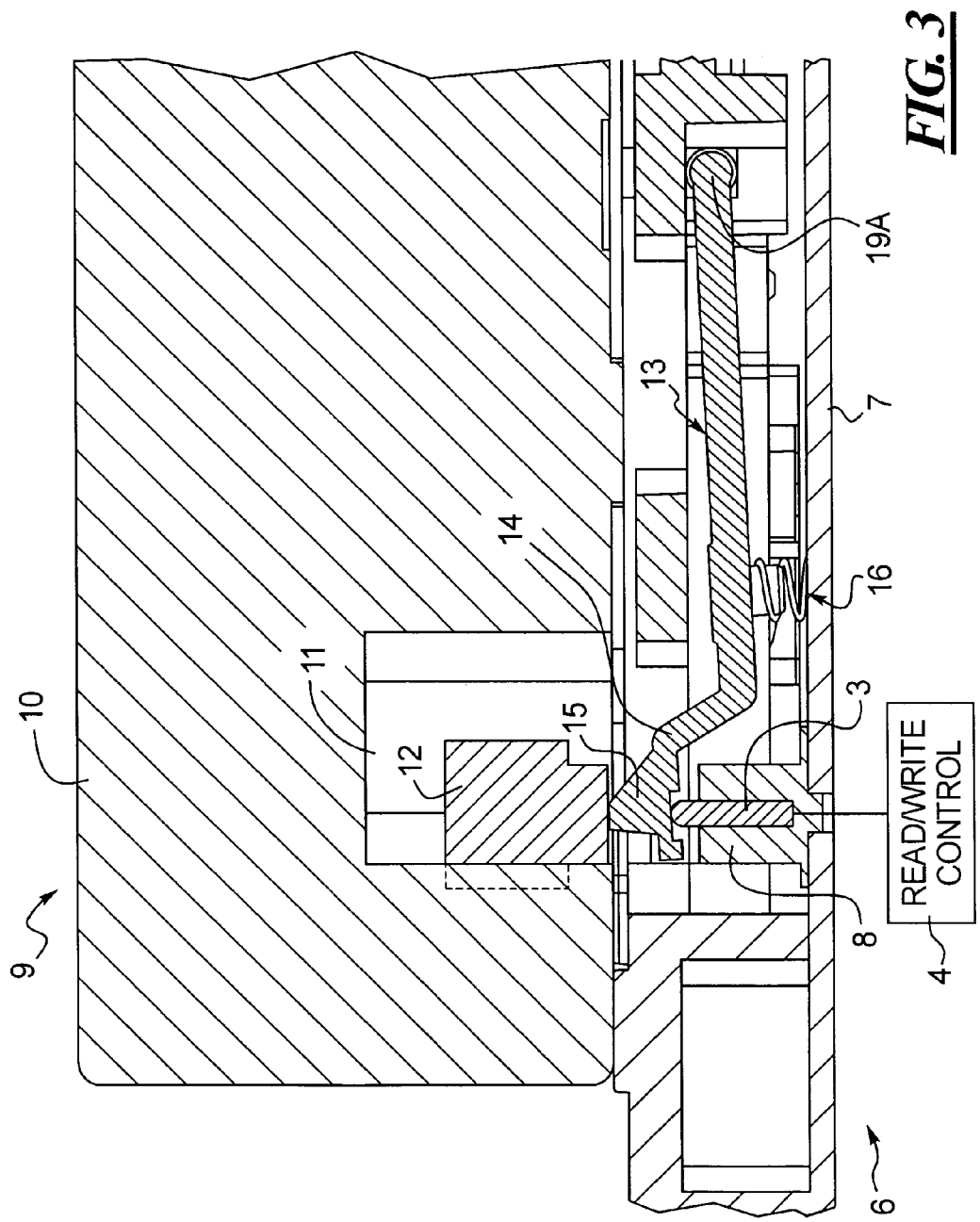
FIG. 3 is a sectional view showing the components of FIG. 2, with the sliding element of the tape cartridge in a closed state.

As shown in FIGS. 2 and 3, a tape drive 6 has a housing 7 in which a microswitch, having a microswitch housing 8 and a microswitch plunger 3, is mounted. The microswitch is electrically connected, as is schematically indicated in FIGS. 2 and 3, to a read/write control 4. The read/write control 4, in a known manner, enables or disenables certain functions of the tape drive 6, relating to data transfer with respect to a tape cartridge 9, dependent on the position of the plunger 3 of the microswitch.

The tape cartridge 9 has a housing 10 with an opening or recess 11 therein. The opening 11 extends to the bottom surface of the housing 10 of the tape cartridge 9, and when the tape cartridge 9 is properly inserted in the tape drive 6, the recess 11 comes to be disposed over the microswitch plunger 3. The opening 11 is opened or closed (blocked) by a sliding element 12 that is disposed in a lateral sidewall of the housing 10. The sliding element 12 is manually actuatable, by means of a lateral back and forth movement, between the open position shown in FIG. 2 and the closed or blocking position shown in FIG. 3.

Figure 4:
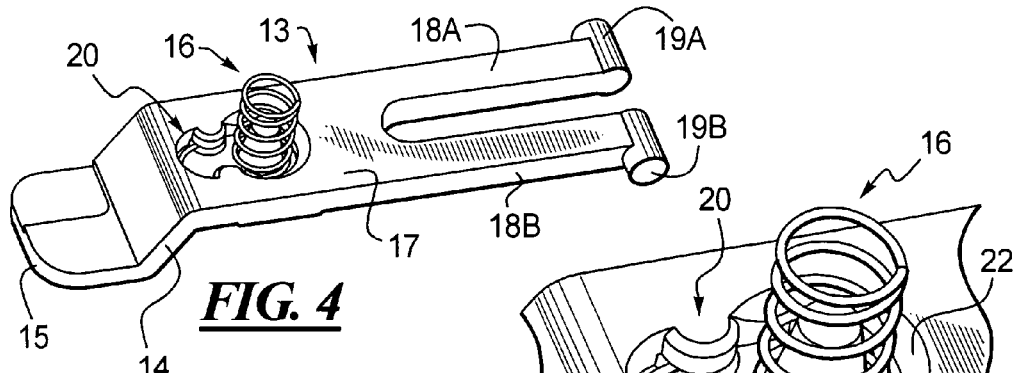
FIG. 4 is a perspective view from below of an embodiment of the plunger protector in accordance with the invention.
Figure 5:
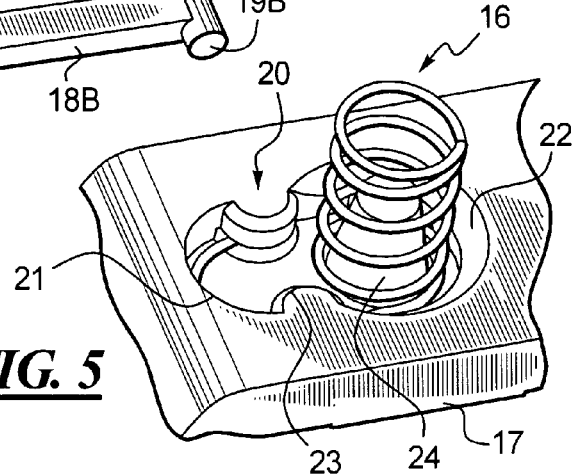
FIG. 5 is an enlarged view showing details of the mounting of the bias spring in the bottom of the plunger protector.

Interposed in the tape drive 6 between the sliding element 12 and the microswitch plunger 3 is a plunger protector 13. The plunger protector 13, in one embodiment, has two legs 18A and 18B (one of which can be seen in the side views of FIGS. 2 and 3). The leg 18A terminates in a small cylinder 19A at a first end of the plunger protector 13 (and the other leg 18B terminates in a small cylinder 19B as well, as can be seen in FIG. 4). The cylinders 19A and 19B allow the first end of the plunger protector 13 to be pivotably mounted in the tape drive 6.

The plunger protector 13 has a central portion 14 that connects the legs 18A and 18B to a second end 15 of the plunger protector 13. The second end 15 of the plunger protector 13 is disposed to interact both with the sliding element 12 and the microswitch plunger 3. A spring 16, disposed between a bottom surface of the plunger protector 13 and the housing 7 of the tape drive 6, normally urges the second end 15 toward the recess 11 of the tape cartridge 9, with the plunger protector 13 executing a pivoting movement with respect to the small cylinders 19A and 19B.

Figure 6A:
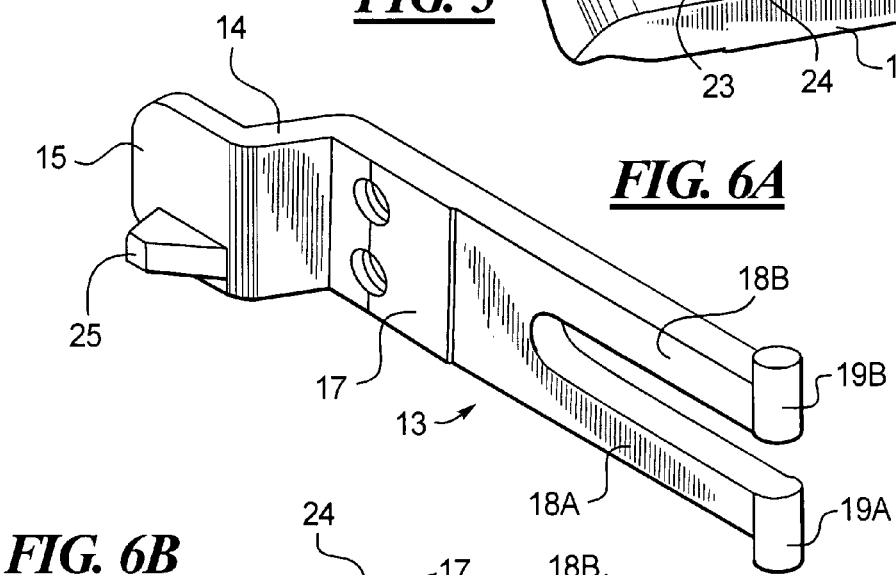
FIG. 6A is a perspective view of a top side of the plunger protector of FIG. 4.
Figure 6B:
FIG. 6B is a side view of the plunger protector of FIGS. 6A and 4.

The second end 15 of the plunger protector 13 has a ramp element 25 thereon, as can be seen in FIGS. 6A and 6B. When the sliding element 12 is laterally moved between the position shown in FIG. 2 to the position shown in FIG. 3, the leading edge or side of the sliding element 12 engages along the ramp element 25, causing the plunger protector 13 to execute a pivoting motion that transfers the lateral forces of the sliding element 12 to substantially perpendicular forces that act on the plunger 3. The plunger 3 thus assumes a first position when the slider 12 opens the recess 11, as shown in FIG. 2, and assumes a second position when the slider 12 closes the recess 11, as shown in FIG. 3. Because of the smooth transition between the lateral movement of the slider 12 and the perpendicular movement of the plunger 3 that is achieved by the plunger protector 13, not only is the plunger 3 protected against damage, but also the slider 12 can be freely moved between the positions shown in FIGS. 2 and 3 without being impeded by the presence of the plunger 3 in the recess 11. Movement of the slider 12 between the positions shown in FIGS. 2 and 3, therefore, can be undertaken without the necessity of removing the tape cartridge 9 from the tape drive 6.

The plunger protector 13 can be made of any suitable relatively rigid material, such as plastic.

Figure 7:
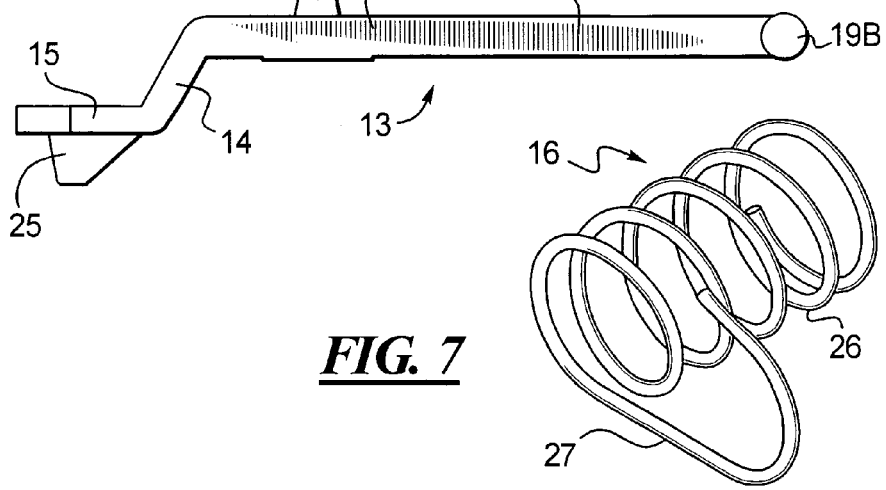
FIG. 7 is an enlarged perspective view of the bias spring of FIG. 5.

Further details of the structure of the plunger protector 13 can be seen in FIGS. 4, 5, 6A and 6B. The plunger protector 13 has a main body 17 that, as noted above, is divided into legs 18A and 18B at the first end of the plunger protector 13. The body 17 has an opening or recess 20 in a bottom surface thereof, in which the bias spring 16 is held. The spring 16, as shown in FIG. 7, has a generally cylindrical coil 26, and an elongated clip 27 at one end of the coil 26. The clip 27 extends into a smaller portion 21 of the opening 20, and is clamped in respective channels in projections 23 of the opening 20. The coil 26 proceeds around a truncated cone 24 in a larger portion 22 of the opening 20.

Although modifications and changes may be suggested by those skilled in the art, it is the intention of the inventor to embody within the patent warranted hereon all changes and modifications as reasonably and properly come within the scope of his contribution to the art.

I claim as my invention:

1. A tape drive adapted to interact with a magnetic tape cartridge having a recess therein selectively closed or opened by a sliding element movable back and forth in said recess, said tape drive comprising:

a drive housing;

a read/write control unit that enables or disenables a recording function relative to said cartridge, dependent on whether said recess is opened or closed by said sliding element;

said read/write control unit comprising a microswitch mounted in said drive housing having a biased plunger movable in a detection direction substantially perpendicular to the back and forth movement of said sliding element, to detect when said recess is opened and when said recess is closed; and a plunger protector having a first end pivotably mounted in said housing and a second end disposed between said plunger and said sliding element, said second end being adapted to smoothly engage said sliding element as said sliding element is moved back and forth in said recess and in response to allow movement of said plunger in said detection direction while preventing breakage of said plunger by the back and forth movement of the sliding element.

2. A tape drive as claimed in claim 1 wherein said plunger protector is pivotably mounted in said tape drive to execute a pivoting motion to smoothly transfer a force in a direction of said back and forth movement of said sliding element to a force in said detection direction acting on said plunger.

3. A tape drive as claimed in claim 2 wherein said plunger protector has a surface adapted to engage said sliding element, and comprising a ramp element disposed on said surface of said plunger protector, said ramp element having a ramp surface adapted to engage a leading side of said element in said recess.

4. A tape drive as claimed in claim 1 comprising a spring disposed in said drive housing and interacting with said plunger protector to urge said second end of said plunger protector toward said recess.

5. A tape drive as claimed in claim 4 wherein said plunger protector has a bottom surface with a surface recess therein, and wherein said spring is held in said surface recess.

6. A tape drive as claimed in claim 1 wherein said plunger protector terminates, at said first end, in a cylinder held in said drive housing to allow pivoting of said plunger protector relative to said cylinder.

7. A tape drive as claimed in claim 1 wherein said plunger protector comprises, at said first end, two legs, each of said two legs terminating in a cylinder, the respective cylinders being mounted in said drive housing to allow pivoting of said plunger protector relative to said cylinders.

8. A combination of a tape drive and a tape cartridge comprising:
    a magnetic tape cartridge having a recess therein selectively closed or opened by a sliding element movable back and forth in said recess; and
    a tape drive comprising a drive housing, a read/write control unit that enables or disenables a recording function relative to said cartridge, dependent on whether said recess is opened or closed by said sliding element, said read/write control unit comprising a microswitch mounted in said drive housing having a biased plunger movable in a detection direction substantially perpendicular to the back and forth movement of said sliding element, to detect when said recess is opened and when said recess is closed, and a plunger protector having a first end pivotably mounted in said housing and a second end disposed between said plunger and said sliding element, said second end smoothly engaging said sliding element as said sliding element is moved back and forth in said recess and in response to allow movement of said plunger in said detection direction while preventing breakage of said plunger by the back and forth movement of the sliding element.

9. For a tape drive that interacts with a magnetic recording tape spooled in a tape cartridge receivable in the tape drive, a method for selectively enabling or disenabling a function related to data storage with respect to said tape drive and said tape cartridge, comprising the steps of:
    selectively opening or closing a recess in said tape cartridge by manually moving a sliding element back and forth in said recess;
    with a microswitch disposed in said tape drive, said microswitch having a plunger movable in a direction substantially perpendicular to back and forth movement of said sliding element, detecting whether said sliding element has opened said recess or whether said sliding element has closed said recess; and
    interposing a plunger protector between said sliding element and said plunger for smoothly transferring a force produced by back and forth movement of said sliding element to a force in a direction of movement of said plunger, acting on said plunger.

10. A method as claimed in claim 9 comprising pivotably mounting said plunger protector in said housing at a first end and disposing a second end of said plunger protector between said plunger and said sliding element.

11. A method as claimed in claim 10 comprising providing a ramp surface on said plunger protector and engaging said sliding element with said ramp surface as said sliding element is moved back and forth in said recess.

12. A method as claimed in claim 11 comprising biasing said plunger protector in said tape drive to urge said plunger protector toward said recess.

\* \* \* \* \*